May 23, 1944. G. W. KINZELMAN 2,349,284
SAFETY DEVICE FOR HYDRAULIC POWER TRANSMISSION APPARATUS
Filed April 7, 1942
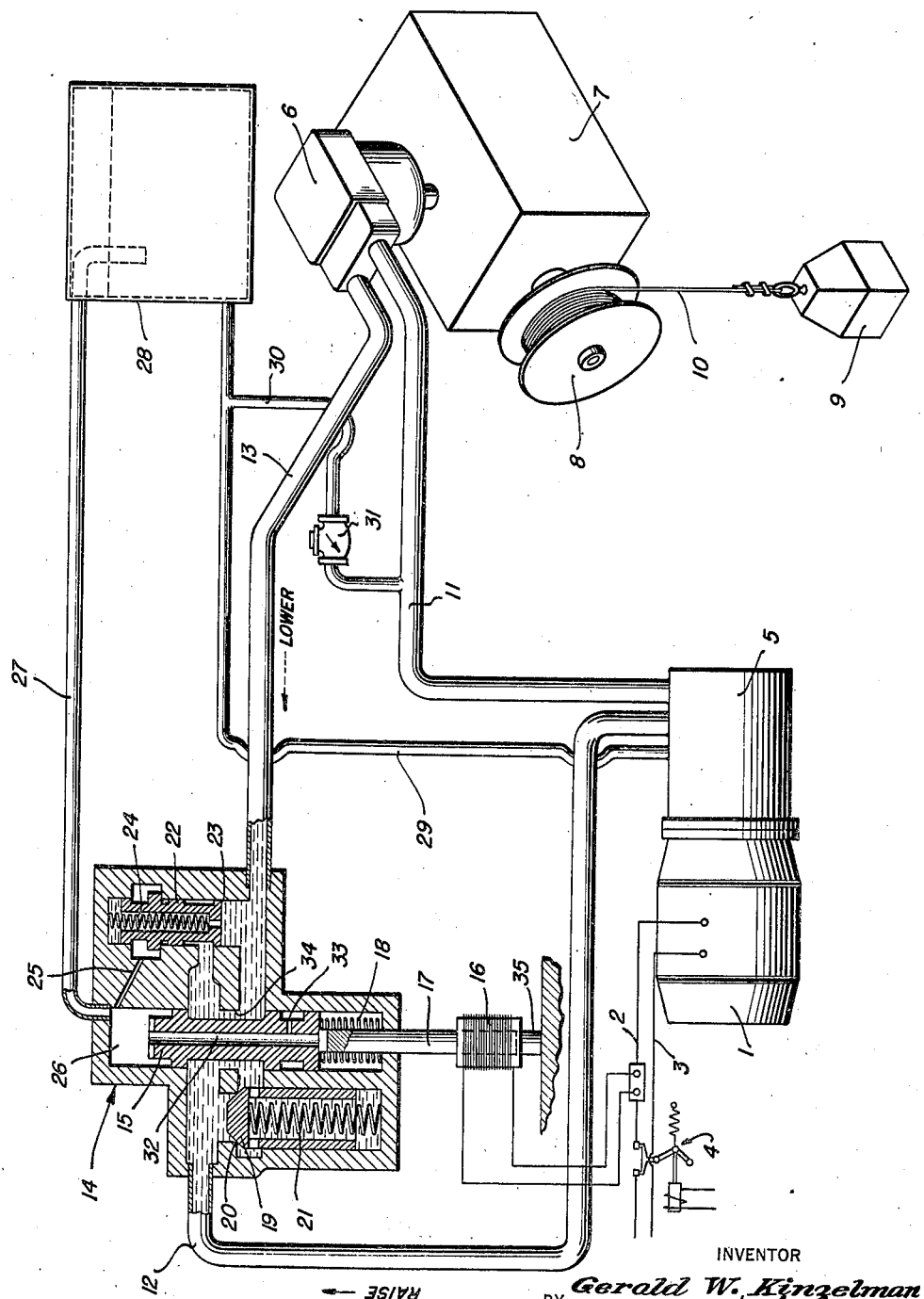
INVENTOR
Gerald W. Kinzelman
BY
ATTORNEY Patented May 23, 1944

2,349,284

UNITED STATES PATENT OFFICE 2,349,284

SAFETY DEVICE FOR HYDRAULIC POWER TRANSMISSION APPARATUS

Gerald W. Kinzelman, Washington, D. C.

Application April 7, 1942, Serial No. 437,924

4 Claims. (Cl. 254—173)

(Granted under the act of March 3, 1883, as amended April 30, 1928; 370 O. G. 757)

This invention relates to hydraulic transmission systems and means for controlling the flow of working fluid through such systems.

The word "hydraulic" is used throughout the following description in its general sense as being definitive of any substantially incompressible fluid, and includes oil and other similar fluids as well as water.

One object is to provide a device for braking a descending load which includes a primary braking device and an emergency, secondary hydraulic braking device which is automatically set into operation upon failure of the primary braking device to prevent the load from descending out of control.

Another object is to provide a system for braking a descending load consisting of an electrical generator operatively connected to be driven by the load for dynamic braking, and a secondary hydraulic braking system which is automatically set into operation upon failure of the dynamic braking action to thereby prevent the load from dropping out of control.

Still another object of my invention is to provide a hydraulic pump-motor system for transmitting power from a prime mover which drives the hydraulic pump to the hydraulic motor which drives a load in which valve means are utilized to restrict the flow of working fluid in the hydraulic system in the event of failure of the prime mover.

A still further object of my invention is to provide a hydraulic pump-motor system for transmitting power from a prime mover which drives the hydraulic pump to the hydraulic motor which drives a hoist in which valve means are utilized to restrict the flow of working fluid in the hydraulic system in the event of failure of the prime mover, thereby preventing any load then being raised by the hoist from dropping out of control.

A more specific object is to provide a hydraulic pump-motor system for transmitting power from a dynamo electric machine which drives the hydraulic pump to the hydraulic motor which drives a hoist in which valve means are utilized to automatically restrict the flow of working fluid in the hydraulic system in the event that current flow between the dynamo electric machine and its source of power is interrupted while the electric machine is operating as an electric motor to raise a load connected to the hoist, thereby preventing the load from dropping out of control; flow of fluid in the hydraulic system is also automatically restricted when the dynamo electric machine fails to supply dynamic braking for a load being lowered by the hoist to thereby limit the dropping speed of the load.

These and other objects of my invention will become more apparent from the following detailed description and from the drawing, the single figure of which is an assembled view in perspective of one embodiment of my invention as applied to an electro-hydraulic hoist apparatus, the valve for controlling the flow of fluid in the hydraulic transmission being shown in section.

Referring now to the drawing, a dynamo electric machine 1, which may be of any suitable type, is connected through conductors 2 and 3 to a source of power through a circuit breaker 4. The electric machine 1 functions as a motor to drive the hoist when raising a load and as a generator when lowering a load.

The electric machine 1 is mechanically connected to a fluid pump 5. The pump 5 may be of any suitable type, such as, for example, the well known Waterbury variable stroke type which has a tilting box by which fluid flow through the pump may be reversed without reversing the direction of rotation of the pump. A pump of this type is described in U. S. Patent No. 1,794,946.

However, it is to be understood that the pump 5 may be of the type which must be reversed in order to reverse a flow of fluid therethrough, in which case the electric machine 1 would then be provided with means for driving it in both directions of rotation.

A fluid motor 6, which may be a companion unit to the pump 5, is connected through a suitable gear box 7 to drive a winding drum 8. A load 9 is raised or lowered by means of a cable 10 which is wound upon drum 8.

The main hydraulic fluid transmission system for circulating working fluid between the fluid pump 5 and fluid motor 6 comprises conduits 11, 12 and 13, a control valve assembly 14, which is shown in section, being interposed between conduits 12 and 13 to control the flow of working fluid in the hydraulic transmission system. The valve assembly 14 contains a central valve member 15 which is normally open in the position shown in the drawing when the hoist is in normal working order and either raising or lowering the load 9. This position is attained by means of the solenoid 16 into which a core member 17 (attached to the central valve member 15) is drawn against an opposed biasing force attained from compression of a coiled spring member 18. If desired, a stop member 35 to limit motion of core 17 may be provided.

A check valve 19 which is biased to a closed position on its seat 20 by a spring member 21 is utilized for a purpose which will be explained more in detail in connection with the description of the operation of my invention.

A relief valve 22 is biased to a closed position on its seat by means of a coiled spring 24. If desired, leakage of fluid in the hydraulic system around the valve 22 may be carried off and returned to the system by means of a passageway 25 which connects with a chamber 26. Fluid flows through conduit 27 into an expansion tank 28 and a conduit 29 provides for flow of the working fluid between the expansion tank and the principal fluid circulating conduits.

A conduit 30 containing a check valve 31 is connected between conduits 29 and 11. The function of conduit 30 and check valve 31 will also be described as the operation of my invention is explained.

The central valve member 15 is provided with a central passageway 32 and a connecting bore 33 and its function is to permit a very limited rate of fluid flow in the hydraulic transmission system when the valve 15 has moved to a closed position upon its seat 34.

*Operation*

If it is desired to raise the load 9, the electric machine 1 functions as a motor receiving energy via conductors 2 and 3. This drives the pump 5 from which working fluid, preferably oil, is forced into conduit 12 from which it passes into valve body 14, through open valve 15 and out of the valve body 14 into conduit 13. From conduit 13 the fluid passes into and drives the fluid motor 6. Return of the working fluid from the motor 6 to the pump 5 is via conduit 11.

In the event that the electric machine 1 should fail while raising the load 9, i. e., should the power supply to the motor be cut off, such as by a power failure in the lines 2 and 3 feeding power to the motor, or by an opening of the circuit breaker 4, it will be evident that unless some safety braking system is provided, the load 9 will, after its inertia has been expended, then drop out of control and is therefore liable to cause serious damage to the load or injury to personnel who may be handling the hoist apparatus. The valve body 14 prevents this in the following manner:

When the electric machine 1 fails, which thus removes the power for operating the fluid pump 5, solenoid 16 will be deenergized, thereby permitting the spring 18 to move the valve 15 to a closed position against its seat 34. Thus the main passageway for working fluid through the valve body 14 will be cut off. However, the working fluid will by-pass the central valve member 15 (which may be referred to as the stop valve), by means of the check valve 19 which is set to operate at a relatively low pressure which may be as low as 5 pounds per square inch.

Fluid will thus continue to flow through the valve body 14 via check valve 19 until the inertia of the load 9 has been expended. As fluid flow in the hydraulic system through the pump and motor ceases and check valve 19 closes, the load would then obviously be held suspended at the position at which it stops. However, the load will now be permitted to lower itself through its own weight at a very low speed by reversing the direction of rotation of the fluid motor 6, which then acts as a fluid pump to force the working fluid through conduit 13 in the direction of the broken arrow. Since the valve 15 is closed, the working fluid will be forced into the port 33, through the central passageway 32 and into the chamber 26. From the chamber 26 the fluid passes through conduit 27 into tank 28 and returns to the low pressure side of the fluid motor 6 by means of conduit 30, check valve 31 which is also set to operate at a relatively low pressure in the direction shown by the arrow, and conduit 11.

In the event that the hoist is being utilized for dropping a load which is of sufficient weight to circulate working fluid through the transmission system in the direction opposite to that in which it flows when the hoist is being utilized to raise a load, in which case the fluid motor 6 would then act as a fluid pump and the fluid pump 5 would then act as a fluid motor, the latter driving the electric machine 1 as a generator, braking action for the load 9 is normally obtained by means of dynamic braking in the generator which may feed current back into the source of electric power through conductors 2 and 3.

This is the normal operation for the hoist device in dropping a load and the working fluid flows uninterrupted through the valve body 14. In the event of failure of the electric machine 1 to furnish dynamic braking while the load is being dropped, it will be obvious that unless some safety braking system is utilized, the load 9 will gain in momentum and reach undesirably high speeds. However, when the electric machine fails and current is no longer flowing in conductors 2 and 3, solenoid 16 will again be deenergized, permitting spring 18 to move the valve 15 to its closed position, shutting off the main path of fluid flow through the valve body 14. Now, due to the kinetic energy of the load 9 pressure of the working fluid (which may be about 850 pounds per square inch when the hoist apparatus is operating in a normal condition) may be built up in the conduit 13 in excess of the normal pressure of the fluid, causing relief valve 22 to open and by-pass the working fluid around the closed valve 15 and into the conduit 12. The relief valve 22 may be set to operate at any desired pressure which, for example, may be approximately 1200 pounds per square inch.

Due to the action of the relief valve 22, the rate of flow of working fluid through the hydraulic transmission system will be gradually decreased, which will obviously cause the speed of the fluid motor 6, and hence the speed of the load 9, to be decreased until such time as the load is substantially stopped by subsequent complete closure of the relief valve 22.

The load 9 will now be permitted to continue to lower itself at a safe speed in a manner hereinbefore explained by flow of working fluid through the port 33 and central passageway 32 in the valve 15.

While the foregoing embodiment of my invention is a preferred one, it will be readily understood that various changes and modifications, in addition to those already suggested, may be made therein without departing from the spirit and scope of the appended claims.

The invention described herein may be manufactured and used by or for the Government of the United States of America for governmental purposes without the payment of any royalties thereon or therefor.

Having thus set forth and disclosed the nature of my invention, what is claimed is:

1. In a drum hoist for raising and lowering a load, the combination comprising a first hydraulic pump-motor device of the rotary type connected to said drum, said device being operable as a fluid motor when driving said drum to raise a load and as a fluid pump when being driven by said drum as the load carried by said drum is permitted to lower itself through its own weight; a second hydraulic pump-motor device of the rotary type; a fluid transmission system connected between said first and second pump-motor devices; a dynamo electric machine connected to said second pump-motor device, said electric machine being connected to a power source, said electric machine being operable as a motor receiving energy from said power source when driving said second pump-motor device as a pump and as a generator feeding energy back to said power source when being driven by said second pump-motor device operating as a motor; and valve means connected in said fluid transmission system for controlling the flow of fluid therethrough, said valve means including a stop valve operable either upon an interruption of current flow to said electric machine when operating as a motor or from said electric machine when operating as a generator to block fluid flow in said system, a check valve openable against a pre-selected fluid pressure to by-pass said stop valve after said current has been interrupted when said electric machine is being operated as a motor, and a second check valve openable against a pre-selected fluid pressure to by-pass said stop valve after said current has been interrupted when said electric machine is being operated as a generator.

2. In a drum type hoist for raising and lowering a load, the combination comprising a first hydraulic pump-motor device of the rotary type connected to said drum, said device being operable as a fluid motor when driving said drum to raise a load and as a fluid pump when being driven by said drum as the load carried by said drum is permitted to lower itself through gravitational forces; a second hydraulic pump-motor device of the rotary type, a hydraulic conduit system connected between said first and second pump-motor devices; a dynamo electric machine being operable as an elecrtic motor when driving said second pump-motor device as a pump and as a loaded electric generator when being driven by said second pump-motor device operating as a motor; and valve means connected in said fluid conduit system for controlling the flow of fluid therethrough, said valve means including a stop valve operable either upon an interruption in current flow to said electris machine when operating as a motor or from said electric machine when operating as a generator to block fluid flow in said system, a check valve openable against a preselected fluid pressure to by-pass said stop valve after said current has been interrupted when said electric machine is being operated as a motor, and a second check valve openable against a preselected fluid pressure to by-pass said stop valve after said current has been interrupted when said electric machine is being operated as a generator.

3. In a drum type hoist for raising and lowering a load, the combination comprising a first hydraulic pump-motor device connected to said drum, said device being operable as a motor when driving said drum to raise a load and as a pump when being driven by said drum as the load carried by said hoist is permitted to lower itself through gravitational forces; a second hydraulic pump-motor device; a fluid transmission system connected between said first and second pump-motor devices; a dynamo electric machine connected to said second pump-motor device, said machine being operable as an electric motor when driving said second pump-motor device as a pump and as a loaded electric generator when being driven by said second pump-motor device operating as a motor; and valve means connected in said fluid transmission system for controlling the flow of fluid therethrough, said valve means including a stop valve operable either upon an interruption in current flow to said electric machine when operating as a motor or from said electric machine when operating as a generator to block fluid flow in said system, a check valve openable at relatively low fluid pressure to by-pass said stop valve after said current has been interrupted when said electric machine is being operated as an electric motor, a second check valve openable against a relatively high fluid pressure to by-pass said stop valve after said current has been interrupted when said electric machine is being operated as a generator whereby the speed of said load and fluid pressure in said system will be gradually reduced permitting said second check valve to reclose, and a bleeder valve operable to permit a relatively low rate of fluid flow in said system after said second valve has reclosed whereby said load will continue to lower itself at a relatively low speed.

4. In a drum type hoist for raising and lowering a load, the combination comprising a first fluid pump-motor device connected to said drum, said device being operable as a motor when driving said drum to raise a load and as a pump when being driven by said drum as the load carried by said drum is permitted to lower itself through gravitational forces; a second fluid pump-motor device; a fluid transmission system connected between said first and second pump-motor devices; a dynamo electric machine connected to said second pump-motor device, said electric machine being connected to a power source, said electric machine being operable as an electric motor receiving energy from said power source when driving said second pump-motor device as a pump and as an electric generator feeding energy to said power source when being driven by said second pump-motor device operating as a motor; and valve means connected in said fluid transmission system for controlling the flow of fluid therethrough, said valve means including a stop valve operable either upon an interruption in current flow to said electric machine when operating as a motor or from said electric machine when operating as a generator to block fluid flow in said system, a check valve openable at relatively low fluid pressure to by-pass said stop valve after said current has been interrupted when said electric machine is being operated as an electric motor, a second check valve openable against a relatively high fluid pressure to by-pass said stop valve after said current has been interrupted when said electric machine is being operated as a generator whereby the speed of said load and fluid pressure in said system will be gradually reduced permitting said second check valve to reclose and a bleeder valve operable to permit a relatively low rate of fluid flow in said system after said second valve has reclosed whereby said load will continue to lower itself at a relatively low speed.

GERALD W. KINZELMAN.